United States Patent
Sivasankaran et al.

(10) Patent No.: US 9,971,514 B2
(45) Date of Patent: May 15, 2018

(54) DYNAMIC LOGICAL GROUPS FOR MAPPING FLASH MEMORY

(71) Applicant: SanDisk Technologies Inc., Plano, TX (US)

(72) Inventors: Vijay Sivasankaran, Bangalore (IN); Vivek Shivhare, Bangalore (IN); Abhijeet Manohar, Bangalore (IN)

(73) Assignee: SanDisk Technologies LLC, Plano, TX (US)

( * ) Notice: Subject to any disclaimer, the term of this patent is extended or adjusted under 35 U.S.C. 154(b) by 360 days.

(21) Appl. No.: 14/261,925

(22) Filed: Apr. 25, 2014

(65) Prior Publication Data

US 2015/0143029 A1 May 21, 2015

(30) Foreign Application Priority Data

Nov. 21, 2013 (IN) .......................... 5362/CHE/2013

(51) Int. Cl.
*G06F 3/06* (2006.01)
*G06F 12/02* (2006.01)

(52) U.S. Cl.
CPC ............ *G06F 3/061* (2013.01); *G06F 3/0616* (2013.01); *G06F 3/0644* (2013.01); *G06F 3/0688* (2013.01); *G06F 12/0246* (2013.01); *G06F 2212/1016* (2013.01); *G06F 2212/1036* (2013.01); *G06F 2212/7201* (2013.01)

(58) Field of Classification Search
CPC .... G06F 3/061; G06F 12/0246; G06F 3/0616; G06F 3/0688; G06F 3/0644; G06F 2212/7201; G06F 2212/1036; G06F 2212/1016

USPC .......................................................... 711/103
See application file for complete search history.

(56) References Cited

U.S. PATENT DOCUMENTS

| | | | |
|---|---|---|---|
| 8,316,176 B1 | 11/2012 | Phan et al. | |
| 8,443,167 B1 | 5/2013 | Fallone et al. | |
| 2005/0141312 A1* | 6/2005 | Sinclair | G06F 11/1072 365/222 |
| 2005/0144357 A1* | 6/2005 | Sinclair | G06F 12/0246 711/103 |
| 2007/0101095 A1* | 5/2007 | Gorobets | G06F 12/0246 711/203 |
| 2010/0023682 A1 | 1/2010 | Lee et al. | |
| 2010/0205352 A1 | 8/2010 | Chu et al. | |
| 2012/0284587 A1 | 11/2012 | Yu et al. | |
| 2012/0320679 A1* | 12/2012 | Sprouse | G11C 7/1015 365/185.12 |
| 2013/0073789 A1 | 3/2013 | Khmelnitsky et al. | |
| 2013/0073816 A1 | 3/2013 | Seo et al. | |

(Continued)

FOREIGN PATENT DOCUMENTS

EP          2 439 645 A1    4/2012
WO    WO 2012/158514 A1    11/2012

*Primary Examiner* — Michael Alsip
(74) *Attorney, Agent, or Firm* — Brinks Gilson & Lione

(57) ABSTRACT

A memory system or flash card may include a controller that indexes a global address table (GAT) with a single data structure that addresses both large and small chunks of data. The GAT may include both large logical groups and smaller logical groups for optimizing write amplification. The addressing space may be organized with a large logical group size for sequential data. For fragmented data, the GAT may reference an additional GAT page or additional GAT chunk that has a smaller logical group size.

19 Claims, 6 Drawing Sheets

(56) References Cited

U.S. PATENT DOCUMENTS

2013/0173842 A1 7/2013 Ng et al.
2014/0047159 A1 2/2014 Ahwal et al.

* cited by examiner

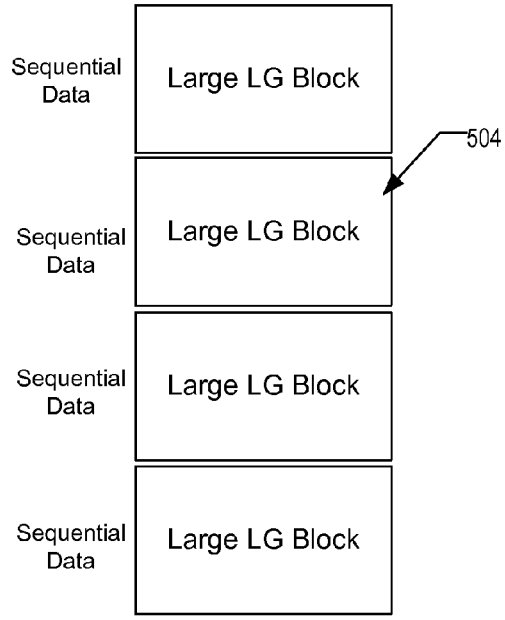
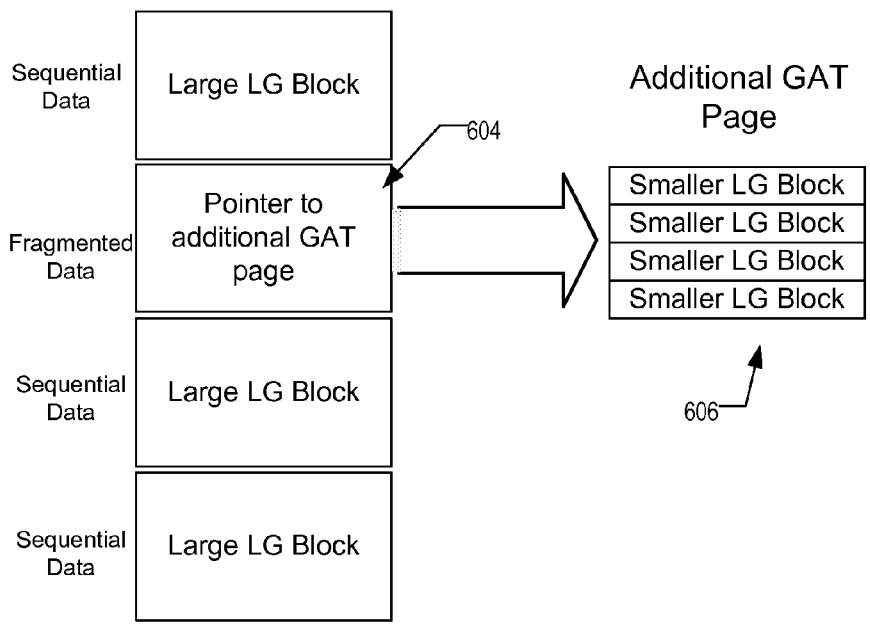

DYNAMIC LOGICAL GROUPS FOR MAPPING FLASH MEMORY

PRIORITY

This application claims priority to India Application Number 5362/CHE/2013, filed on Nov. 21, 2013, entitled "DYNAMIC LOGICAL GROUPS FOR MAPPING FLASH MEMORY", the entire disclosure of which is herein incorporated by reference.

TECHNICAL FIELD

This application relates generally to memory devices. More specifically, this application relates to minimizing write amplification and improving performance in non-volatile semiconductor flash memory by modifying the global address table mappings.

BACKGROUND

Non-volatile memory systems, such as flash memory, have been widely adopted for use in consumer products. Flash memory may be found in different forms, for example in the form of a portable memory card that can be carried between host devices or as a solid state disk (SSD) embedded in a host device. Flash memory may be written in pages and erased in blocks, so once a page is written, a rewrite may require the whole block to be erased. In firmware, once data is rewritten, the old data may be marked as invalid so that it can be erased during garbage collection and may write the new data in another already erased block. Multi-level cell (MLC) memory may be subject to endurance or performance problems as a result of data groups that are frequently rewritten. The memory device firmware may handle memory in logical groups and the logical to physical address table (i.e. the global address table or "GAT") may have an entry for each logical group.

Write amplification refers to a comparison of the actual amount of data with the logical amount that should be written. In one example, write amplification may be expressed as the ratio of writes from the host (i.e. the logical data that should be written) and the writes going to the memory (i.e. the actual data written). The write amplification effect may be caused by background operations that move/rewrite data (e.g. garbage collection). In particular, the rewriting of data may be necessary because an entire block must be erased before being written to. Write amplification increases the number of writes and reduces the life of the memory. Accordingly, a reduction in write amplification can improve the life of the memory.

SUMMARY

A logical group ("LG") may be smallest unit of data managed or addressed by a memory manager. To address random performance requirements, the size of an LG has been shrinking from a block level to as small as a page (or partial page). Accordingly, the space required in the addressing table increases along with the need for processing. The group address table ("GAT") page contains mapping of the logical to the physical address translation for each LG, and with a smaller LG, an increase in the number of GAT pages (or entries) is needed to index the LGs. This results in more processing and more RAM to cache the control structures. The LG size may determine the performance and the write amplification of a device.

A single data structure (such as the GAT) may address both large and small chunks of data. In other words, the GAT may include both large LGs and smaller LGs for optimizing write amplification. Initially the entire addressing space may be organized as large chunks (large LG size) with each unit of entry in the data structure representing one big chunk of data. The large LG size is maintained for sequential data, however, for fragmented data the GAT may refer to an additional GAT page or additional GAT chunk that has a smaller LG size. In other words, the GAT functions to handle different LG sizes.

BRIEF DESCRIPTION OF THE DRAWINGS

FIG. 5 is one embodiment of a global address table.

FIG. 6 is one embodiment of a global address table with an additional GAT page.

BRIEF DESCRIPTION OF THE PRESENTLY PREFERRED EMBODIMENTS

Figure 1:
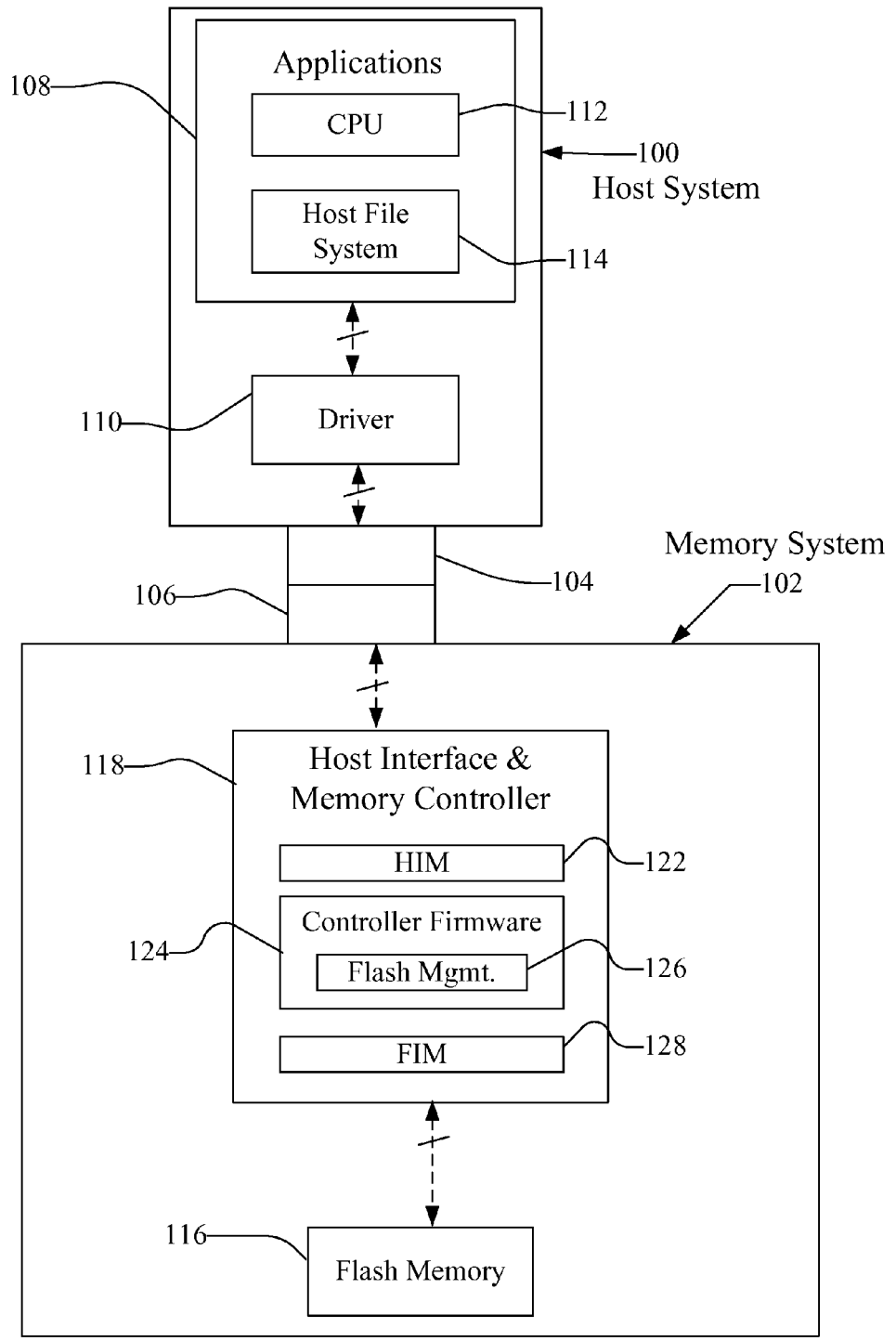
FIG. 1 is a block diagram of a host connected with a memory system having non-volatile memory.

A flash memory system suitable for use in implementing aspects of the invention is shown in FIGS. 1-6. A host system 100 of FIG. 1 stores data into and retrieves data from a flash memory 102. The flash memory may be embedded within the host, such as in the form of a solid state disk (SSD) drive installed in a personal computer. Alternatively, the memory 102 may be in the form of a flash memory card that is removably connected to the host through mating parts 104 and 106 of a mechanical and electrical connector as illustrated in FIG. 1. A flash memory configured for use as an internal or embedded SSD drive may look similar to the schematic of FIG. 1, with one difference being the location of the memory system 102 internal to the host. SSD drives may be in the form of discrete modules that are drop-in replacements for rotating magnetic disk drives. As described, flash memory may refer to the use of a negated AND (NAND) cell that stores an electronic charge.

Examples of commercially available removable flash memory cards include the CompactFlash (CF), the Multi-MediaCard (MMC), Secure Digital (SD), miniSD, Memory Stick, SmartMedia, TransFlash, and microSD cards. Although each of these cards may have a unique mechanical and/or electrical interface according to its standardized specifications, the flash memory system included in each may be similar. These cards are all available from SanDisk Corporation, assignee of the present application. SanDisk also provides a line of flash drives under its Cruzer trademark, which are hand held memory systems in small packages that have a Universal Serial Bus (USB) plug for connecting with a host by plugging into the host's USB receptacle. Each of these memory cards and flash drives includes controllers that interface with the host and control operation of the flash memory within them.

Host systems that may use SSDs, memory cards and flash drives are many and varied. They include personal computers (PCs), such as desktop or laptop and other portable computers, tablet computers, cellular telephones, smartphones, personal digital assistants (PDAs), digital still cameras, digital movie cameras, and portable media players. For portable memory card applications, a host may include a built-in receptacle for one or more types of memory cards or flash drives, or a host may require adapters into which a memory card is plugged. The memory system may include its own memory controller and drivers but there may also be some memory-only systems that are instead controlled by software executed by the host to which the memory is connected. In some memory systems containing the controller, especially those embedded within a host, the memory, controller and drivers are often formed on a single integrated circuit chip. The host may communicate with the memory card using any communication protocol such as but not limited to Secure Digital (SD) protocol, Memory Stick (MS) protocol and Universal Serial Bus (USB) protocol.

The host system 100 of FIG. 1 may be viewed as having two major parts, insofar as the memory device 102 is concerned, made up of a combination of circuitry and software. An applications portion 108 may interface with the memory device 102 through a file system module 114 and driver 110. In a PC, for example, the applications portion 108 may include a processor 112 for running word processing, graphics, control or other popular application software. In a camera, cellular telephone that is primarily dedicated to performing a single set of functions, the applications portion 108 may be implemented in hardware for running the software that operates the camera to take and store pictures, the cellular telephone to make and receive calls, and the like.

The memory system 102 of FIG. 1 may include non-volatile memory, such as flash memory 116, and a device controller 118 that both interfaces with the host 100 to which the memory system 102 is connected for passing data back and forth and controls the memory 116. The device controller 118 may be implemented on a single integrated circuit chip, such as an application specific integrated circuit (ASIC). The device controller 118 may include a multi-thread processor capable of communicating via a memory interface 128 having I/O ports for each memory bank in the flash memory 116. The device controller 118 may include an internal clock. The processor of the device controller 118 may communicate with an error correction code (ECC) module, a RAM buffer, and a boot code ROM via an internal data bus.

The device controller 118 may convert between logical addresses of data used by the host 100 and physical addresses of the flash memory 116 during data programming and reading. Functionally, the device controller 118 may include a Host interface module (HIM) 122 that interfaces with the host system controller logic 110, and controller firmware module 124 for coordinating with the host interface module 122, and flash interface module (FIM) 128. Flash management logic 126 may be part of the controller firmware 124 for internal memory management operations such as garbage collection. One or more flash interface modules (FIMs) 128 may provide a communication interface between the controller with the flash memory 116.

A flash transformation layer ("FTL") or media management layer ("MML") may be integrated in the flash management 126 and may handle flash errors and interfacing with the host. In particular, flash management 126 is part of controller firmware 124 and FTL may be a module in flash management. The FTL may be responsible for the internals of NAND management. In particular, the FTL may be an algorithm in the memory device firmware which translates writes from the host 100 into writes to the flash memory 116. The FTL may be needed because: 1) the flash memory may have limited endurance; 2) the flash memory 116 may only be written in multiples of pages; and/or 3) the flash memory 116 may not be written unless it is erased as a block. The FTL understands these potential limitations of the flash memory 116 which may not be visible to the host 100. Accordingly, the FTL attempts to translate the writes from host 100 into writes into the flash memory 116.

The FTL may include the logical block address ("LBA") map that translates addresses for the flash memory. An FTL algorithm may provide logical to physical address mapping which includes an algorithm to convert logical addresses from the file system to physical addresses of flash memory. The FTL includes power-off recovery and even though a sudden power-off occurs during FTL operations, the data structures of the FTL system can be recovered and its consistency maintained. Wear-leveling by the FTL includes monitoring block usage so that the wear across blocks is even to prevent certain blocks from excessive wear, which would result in a greater chance of failure. The monitoring may result in increased write amplification, and the data structure described below with respect to FIGS. 5-7 for the LBA map and the GAT can counteract that performance reduction.

In one embodiment, the flash memory 116 may be considered to include multi-level cell (MLC) or single level cell (SLC) memory. The memory may be included as part of the device controller 118 rather than as part of the flash memory 116 in some embodiments. The flash memory 116 may be mostly MLC, while binary cache and update blocks may be SLC memory. Update blocks may be SLC memory with page based addressing or page based Logical Group (LG) organization. The LG size for the GAT may depend on the data. For example, sequential data may be indexed with a large LG size, while fragmented data may be indexed with a smaller LG size. In particular, the GAT may default to a large LG size, but reference additional GAT pages for fragmented data, where the additional GAT pages include a smaller LG size. The LG size for the GAT and additional GAT pages may occur at the FTL or flash management 126 of the controller 118.

Figure 2:
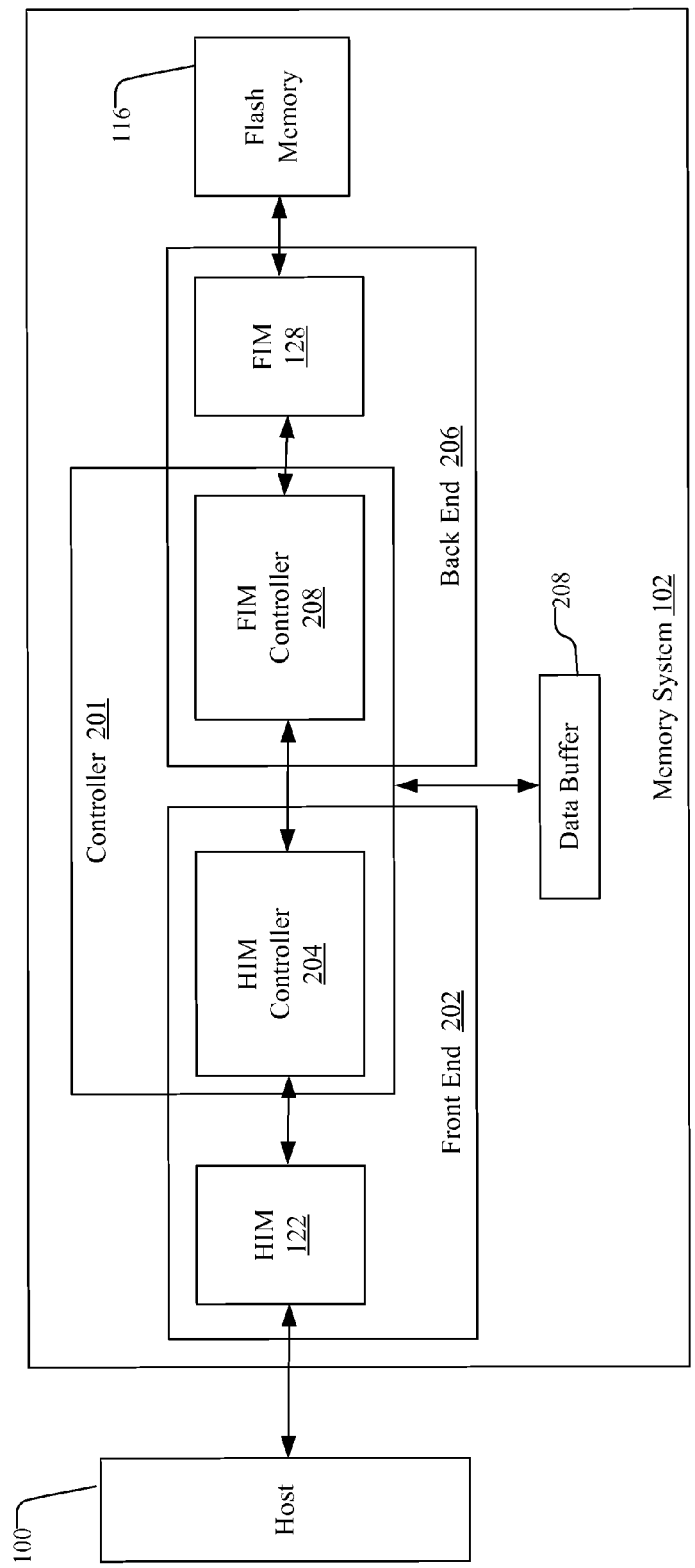
FIG. 2 is a block diagram of an alternative memory communication system.

FIG. 2 is a block diagram of an alternative memory communication system. The host system 100 is in communication with the memory system 102 as discussed with respect to FIG. 1. The memory system 102 includes a front end 202 in communication with the host and a back end 206 coupled with the flash memory 116. In one embodiment, the front end 202 and the back end 206 may be referred to as the memory controller and may be part of the device controller 118. The front end 202 may logically include a Host Interface Module (HIM) 122 and a HIM controller 204. The back end 206 may logically include a Flash Interface Module (FIM) 128 and a FIM controller 208. Accordingly, the controller 201 may be logically portioned into two modules, the HIM controller 204 and the FIM controller 208. The HIM 122 provides interface functionality for the host device 100, and the FIM 128 provides interface functionality for the flash memory 116. The controller 201 may be coupled with a data buffer 208.

In operation, data is received from the HIM 122 by the HIM controller 204 during a write operation of host device 100 on the memory system 102. The HIM controller 204 may pass control of data received to the FIM controller 208, which may include the FTL discussed above. The FIM controller 208 may determine how the received data is to be written onto the flash memory 116 optimally. The received data may be provided to the FIM 128 by the FIM controller 208 for writing data onto the flash memory 116 based on the determination made by the FIM controller 208. The FIM controller 208 and the FTL may operate the logical to physical mapping of memory stored in the flash memory 116. In particular, the FIM controller 208 may operate a single data structure (e.g. GAT) that addresses both large LG chunks and small LG chunks as described below with respect to FIGS. 5-7.

Figure 3:
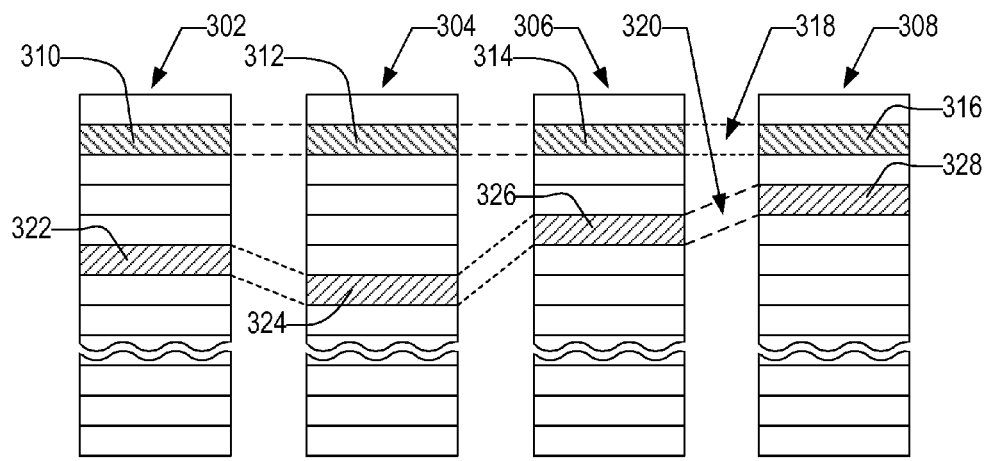
FIG. 3 is an example physical memory organization of the system of FIG. 1.

FIG. 3 conceptually illustrates an organization of the flash memory 116 (FIG. 1) as a cell array. The flash memory 116 may include multiple memory cell arrays which are each separately controlled by a single or multiple memory controllers 118. Four planes or sub-arrays 302, 304, 306, and 308 of memory cells may be on a single integrated memory cell chip, on two chips (two of the planes on each chip) or on four separate chips. The specific arrangement is not important to the discussion below. Of course, other numbers of planes, such as 1, 2, 8, 16 or more may exist in a system. The planes are individually divided into groups of memory cells that form the minimum unit of erase, hereinafter referred to as blocks. Blocks of memory cells are shown in FIG. 3 by rectangles, such as blocks 310, 312, 314, and 316, located in respective planes 302, 304, 306, and 308. There can be any number of blocks in each plane.

The block of memory cells is the unit of erase, and the smallest number of memory cells that are physically erasable together. For increased parallelism, however, the blocks may be operated in larger metablock units or chunks. One block from each plane is logically linked together to form a metablock. The four blocks 310, 312, 314, and 316 are shown to form one metablock 318. All of the cells within a metablock are typically erased together. The blocks used to form a metablock need not be restricted to the same relative locations within their respective planes, as is shown in a second metablock 320 made up of blocks 322, 324, 326, and 328. Although it is usually preferable to extend the metablocks across all of the planes, for high system performance, the memory system can be operated with the ability to dynamically form metablocks of any or all of one, two or three blocks in different planes. This allows the size of the metablock to be more closely matched with the amount of data available for storage in one programming operation.

Figure 4:
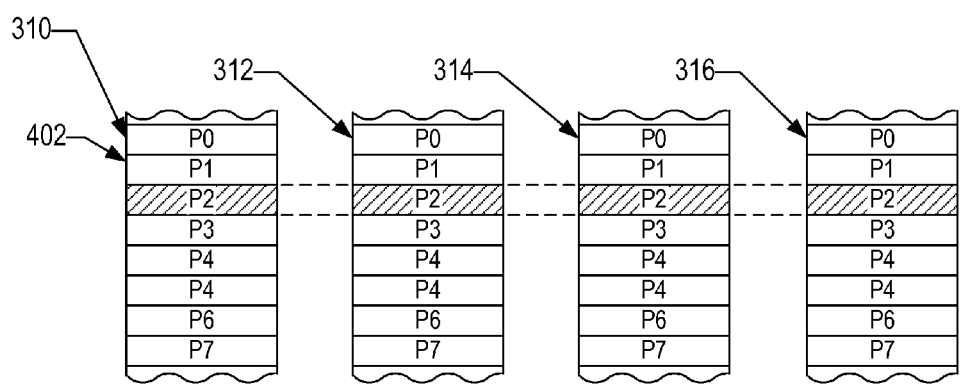
FIG. 4 is an expanded view of a portion of the physical memory of FIG. 4.

The individual blocks are in turn divided for operational purposes into pages of memory cells, as illustrated in FIG. 4. The memory cells of each of the blocks 310, 312, 314, and 316, for example, are each divided into eight pages P0-P7. Alternatively, there may be 16, 32 or more pages of memory cells within each block. The page is the unit of data programming and reading within a block, containing the minimum amount of data that are programmed or read at one time. However, in order to increase the memory system operational parallelism, such pages within two or more blocks may be logically linked into metapages. A metapage 402 is illustrated in FIG. 3, being formed of one physical page from each of the four blocks 310, 312, 314, and 316. The metapage 402, for example, includes the page P2 in each of the four blocks but the pages of a metapage need not necessarily have the same relative position within each of the blocks. A metapage may be the maximum unit of programming.

The memory cells may be operated to store two levels of charge so that a single bit of data is stored in each cell. This is typically referred to as a binary or single level cell (SLC) memory. SLC memory may store two states: 0 or 1. Alternatively, the memory cells may be operated to store more than two detectable levels of charge in each charge storage element or region, thereby to store more than one bit of data in each. This latter configuration is referred to as multi-level cell (MLC) memory. For example, MLC memory may store four states and can retain two bits of data: 00 or 01 and 10 or 11. Both types of memory cells may be used in a memory, for example binary SLC flash memory may be used for caching data and MLC memory may be used for longer term storage. The charge storage elements of the memory cells are most commonly conductive floating gates but may alternatively be non-conductive dielectric charge trapping material.

FIG. 5 is one embodiment of a global address table (GAT) 502. FIG. 5 illustrates that GAT 502 includes large logical group (LG) blocks for each entry 504. The large LG blocks may be maintained for sequential data. In particular, the GAT 502 may be initially organized as large chunks with each unit of entry in the data structure representing a large chunk of data. In one embodiment, a large chunk or large LG block may be 4 megabytes (MB). Using a large LG size enables addressing a large amount of data with a singe index or entry in both RAM and flash memory for reducing processing overhead. Sequential data may refer to data that is grouped together or data that is not fragmented. Such a group of data can be indexed together (in one entry 504) to maintain the efficiencies gained by fewer entries in the GAT 502. However, when the data is not sequential and is fragmented, then the LG block size for each entry can be reduced.

Sequential data may include data that is contiguous in the logical address space, which may offer significant advantage in terms of performance and write amplification when placed in physically contiguous locations. In one embodiment, there may be heuristic based algorithms to predict sequential data for creating a GAT entry. As described, there may be a staging area maintained for GAT entries where every new entry is checked against the existing ones to see if any of them can be expanded (i.e. converted in a run length of physical locations). Once a run length (e.g. 4M) is built up of that entry it may then be converted to a GAT entry.

Although one embodiment is referred to as a 4M-4K LG approach to refer to the block size and GAT, alternative embodiments are possible. For example, there may be a tiered LG approach. It could be expanded to be multiple levels. For a three tiered approach there may be a table of 4M entry if any of them is fragmented, then that points to a table of 512K entries (considering there is a chance that only a small range within the 4M entry has been fragmented) where each of the 512K entries signal whether they are sequential or fragmented. If they are fragmented, then they point to 4K tables. Similarly the scheme may be extended to n-levels.

FIG. 6 is one embodiment of a global address table (GAT) 502 with an additional GAT page 606. The additional GAT page 606 may also be referred to as an additional GAT chunk or additional index. While labeled as additional, the additional GAT page 606 may be considered to be part of the GAT 502. In other words, the additional GAT page 606 may be part of the same data structure as the GAT 502 or it may be a different data structure that is merely pointed to from the GAT 502. FIG. 6 illustrates three entries of the GAT 502 that reference sequential data, while one entry 604 references fragmented data. The GAT entry 604 with fragmented data points to an additional GAT page 606 that includes smaller LG blocks. While the default GAT 502 has large LG blocks for sequential data, the additional GAT page 606 has smaller LG blocks that can reduce the write amplification that would otherwise be associated with rewriting and copying from a large LG block (e.g. during garbage collection). In one embodiment, the smaller LG block size of the additional GAT page 606 may be 4 kilobytes (KB) compared with 4 MB for a larger LG block size.

Figure 7:
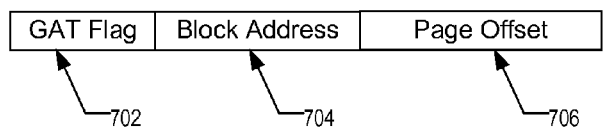
FIG. 7 is one embodiment of an exemplary data structure.

FIG. 7 is one embodiment of the data structure for a GAT 502 and additional GAT page 706. The data structure may utilize a GAT flag 702 to signify whether the address of the data is in the GAT or in an additional GAT page. In one embodiment, the GAT flag 702 is a single bit where a zero indicates an address from the GAT (e.g. sequential data), while a one indicates that the address is on an additional GAT page (e.g. fragmented data that is addressed with a smaller LG size). The block address 704 refers to the physical address of the data when the GAT flag 702 is zero. The block address 704 refers to the address or location of the GAT block when the GAT flag 702 is one. The page offset 706 is a LG offset for the GAT or a GAT page offset for the additional GAT page.

Figure 8:
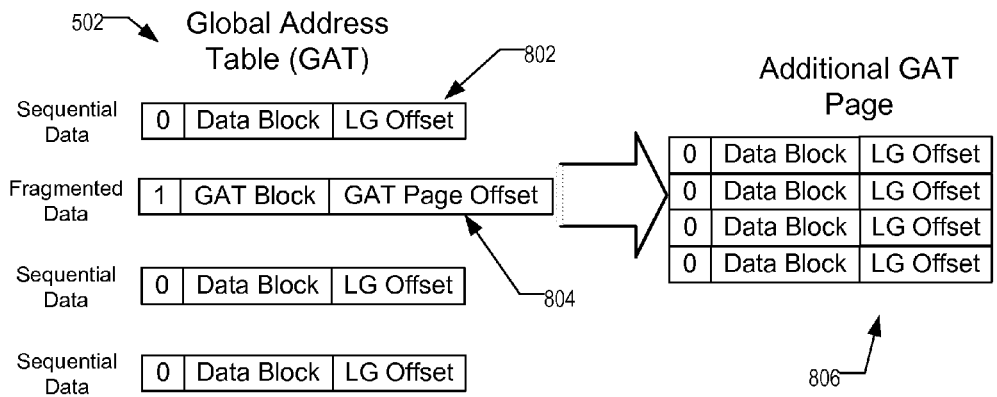
FIG. 8 is one embodiment using the data structure of FIG. 7 for a global address table and additional GAT page.

FIG. 8 is one embodiment using the data structure of FIG. 7 for a GAT 502 and additional GAT page 806. In particular, sequential data results in an entry 802 that includes a GAT flag of zero, a block address for the data, and an LG offset. For fragmented data, the entry 804 includes a GAT flag of 1, a block address for the GAT block, and a GAT page offset. The entry 804 provides an address or location of the additional GAT page 806. The data structure for the GAT 502 has a large LG size, while the LG size for the additional GAT page 806 is smaller.

Figure 9:
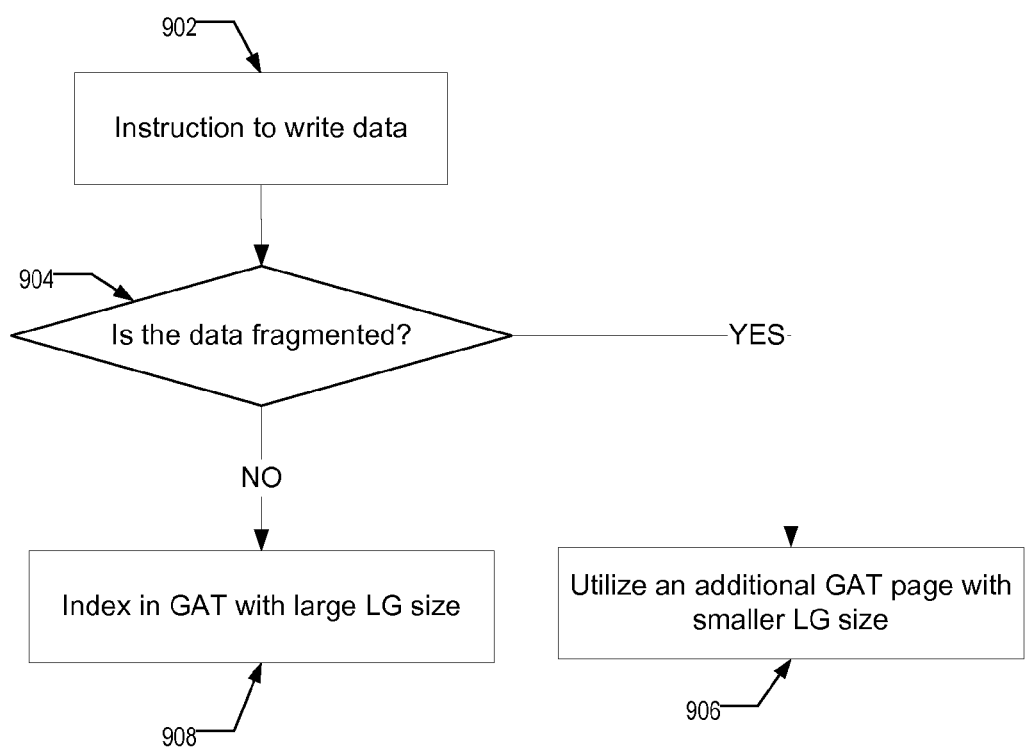
FIG. 9 is an exemplary process for indexing with different logical group (LG) sizes.

FIG. 9 is an exemplary process for indexing with different logical group (LG) sizes. In block 902, when data is to be written to the flash memory, a determination is made as to whether it is sequential/contiguous or fragmented data in block 904. For example, sequential data may be from the same file. When the data is determined to be fragmented, then that data will be indexed through one or more additional GAT pages that have a smaller LG size as in block 906. In particular, the index of a particular entry (that was a large LG size) may be changed to point to the one or more additional GAT pages (with smaller LG size). This expands the large LG into multiple smaller LGs. In other words, the GAT index that corresponds to a randomly written logical block address is expanded into multiple smaller entries to represent each element (e.g. each smaller LG block, such as 4 KB) in the large LG block (e.g. within the 4 MB range). If the data is determined to be sequential in block 904, then the data may be indexed in the GAT with the larger LG size as in block 908.

A "computer-readable medium," "machine readable medium," "propagated-signal" medium, and/or "signal-bearing medium" may comprise any device that includes, stores, communicates, propagates, or transports software for use by or in connection with an instruction executable system, apparatus, or device. The machine-readable medium may selectively be, but not limited to, an electronic, magnetic, optical, electromagnetic, infrared, or semiconductor system, apparatus, device, or propagation medium. A non-exhaustive list of examples of a machine-readable medium would include: an electrical connection "electronic" having one or more wires, a portable magnetic or optical disk, a volatile memory such as a Random Access Memory "RAM", a Read-Only Memory "ROM", an Erasable Programmable Read-Only Memory (EPROM or Flash memory), or an optical fiber. A machine-readable medium may also include a tangible medium upon which software is printed, as the software may be electronically stored as an image or in another format (e.g., through an optical scan), then compiled, and/or interpreted or otherwise processed. The processed medium may then be stored in a computer and/or machine memory.

In an alternative embodiment, dedicated hardware implementations, such as application specific integrated circuits, programmable logic arrays and other hardware devices, can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

We claim:

1. A flash memory device comprising:
a non-volatile storage having an array of memory blocks storing data; and a controller in communication with the non-volatile storage, the controller is configured for:
accessing a global address table (GAT) that utilizes a large logical group size for each entry of the GAT for indexing a large chunk of sequential data;
receiving a request for data to be written;
indexing the data to be written in the entries of the GAT with the large logical group size when the data to be written is sequential;
creating, when the data to be written is fragmented, an additional GAT index comprising entries utilizing a smaller logical group size for indexing fragmented data;
modifying, when the data to be written is fragmented an entry of the GAT to include a pointer to the additional GAT index, so that an entry of the GAT index points to the additional GAT index for the fragmented data rather than indexing the fragmented data using the entries with the large logical group size; and
indexing, when the data to be written is fragmented, the data to be written through the entries with the smaller logical group size in the additional GAT index rather than indexing the fragmented data using the entries with the large logical group size from the GAT.

2. The device of claim 1 wherein the additional GAT page is referenced from the GAT by the pointer.

3. The device of claim 1 wherein the GAT and the additional GAT include different entries.

4. The device of claim 1 wherein the GAT comprises a flag for each entry that signifies whether physical data is addressed in the GAT or addressed in the additional page.

5. The device of claim 4 wherein the flag is a one bit value.

6. The device of claim 4 wherein when the physical data is addressed in the GAT, an entry includes a data block and a logical group offset.

7. The device of claim 4 wherein when the physical data is addressed in the additional GAT page, an entry includes a GAT block and the pointer comprises a GAT page offset for identifying the additional GAT page.

8. The device of claim 1 wherein the large logical group size comprises approximately four megabytes and the small logical group size comprises approximately four kilobytes.

9. A method for evaluating flash memory in a memory device comprising:
in the memory device having a controller and blocks of memory, the controller:
utilizes a global address table (GAT) with entries having a large logical group size;
receives a request for data to be written;
determines whether the data to be written is sequential or fragmented;
indexes the data in one or more of the entries having the large logical group size in the GAT when the data is determined to be sequential; and
indexes, when the data is determined to be fragmented, the data with an additional GAT index that has entries utilizing a smaller logical group size than the large logical group size of the GAT, wherein the entries of the GAT include sequential data indexed with the large logical group size or includes a pointer to the additional GAT index for indexing the fragmented data with the entries indexed with the smaller logical group size from the additional GAT index.

10. The method of claim 9 wherein the additional GAT index is located from an address in the pointer with the GAT.

11. The method of claim 9 wherein the GAT comprises a flag for each entry that signifies whether physical data is addressed in the GAT or addressed in the GAT additional page.

12. The method of claim 11 wherein the flag is a one bit value.

13. The method of claim 11 wherein when the physical data is addressed in the GAT, an entry includes a data block and a logical group offset.

14. The method of claim 11 wherein when the physical data is addressed in the additional GAT index, an entry includes a GAT block and a GAT page offset for identifying the additional GAT index.

15. A flash memory device comprising:
a non-volatile storage having an array of memory blocks storing data; and
a controller in communication with the non-volatile storage, the controller is configured for:
accessing a global address table (GAT) index that utilizes a large logical group size for indexing a large chunk of data;
accessing a second GAT index that utilizes a first smaller logical group size for indexing a smaller chunk of data than the large chunk of data;
accessing a third GAT index that utilizes an second smaller logical group size that is smaller than the first smaller logical group size;
indexing sequential data with the GAT index; and
indexing random data with either the second GAT index or the third GAT index.

16. The flash memory device of claim 15 wherein the GAT index references the second GAT index and the second GAT index references the third GAT index.

17. The flash memory device of claim 16 wherein sequential portions of the random data is stored in the second GAT index, while further fragmented portions of the random data is stored in the third GAT index.

18. The flash memory device of claim 15 wherein the GAT index, the second GAT index, and the third GAT index include different entries.

19. The flash memory device of claim 15 wherein the logical group size corresponds with whether data is sequential or fragmented, such that larger portions of sequential data are indexed with the large logical group size of the GAT index and smaller portions of sequential data within the random data is indexed by the second GAT index or third GAT index.

* * * * *